United States Patent Office 3,429,850
Patented Feb. 25, 1969

3,429,850
STABILIZED POLYPHENYLENE ETHER
COMPOSITIONS
Klaus E. Holoch, Pittsfield, Mass., assignor to General
Electric Company, a corporation of New York
No Drawing. Filed Jan. 18, 1967, Ser. No. 610,006
U.S. Cl. 260—45.9       6 Claims
Int. Cl. C08g 51/60, 51/56, 43/00

ABSTRACT OF THE DISCLOSURE

A stabilized polyphenylene ether composition consisting of a major portion of a polyphenylene ether and a minor portion of a stabilizer composed of a hexaalkylphosphoric triamide, a boron compound and an acidic phosphorus compound.

---

This invention relates to polyphenylene ether plastics, and more particularly, to the stabilization of such plastics with a stabilizer consisting essentially of a hexaalkylphosphoric triamide, a boron compound and an acidic phosphorus compound.

It is known that the polyphenylene ethers, and particularly, the 2,6-dialkyl substituted polyphenylene ethers, are somewhat unstable under the influence of heat and light causing the resin to become dark colored, brittle and undesirable for many uses. The cause of the degradation is not fully understood, but is believed to be due, in part, to the presence of hydroxyl groups on the polymer chain, a sensitivity to oxygen containing atmospheres and the degradative effect of traces of impurities present in the resin composition.

The term "polyphenylene ether" includes those polymers disclosed and claimed in copending U.S. patent applications of Allan S. Hay, Ser. Nos. 212,127 and 212,128; the polymers disclosed and claimed in the U.S. patents, Numbers 3,257,357 and 3,257,358 of Gelu Stoeff Stamatoff (all incorporated herein by reference), and the various copolymers and blends of the polyphenylene ethers formed by copolymerizing or blending the polyphenylene ethers with other monomers or polymers such as the polyolefins, polystyrenes, polycarbonates and the like wherein the polyphenylene ether is present in an amount sufficient to effect the properties of the polymer composition due to the influence of heat and light.

Heretofore, a large number of different compounds such as the phenolic antioxidants exemplified by p-phenylphenol, N-steroyl-p-aminophenol and 2,2'-methylene-bis (4-ethyl-6-tert.butylphenol) have been used as heat and light stabilizers for the polyphenylene ether compositions. These stabilizers are generally unsatisfactory for even short exposures to heat. Other stabilizers such as the ketenes, benzoic anhydride and the mercaptobenzimidazoles have also been tried and found to be effective for short periods of exposure, but not for the relatively long exposures required for many commercial uses.

In copending U.S. patent application, Ser. No. 610,134 filed January 18, 1967 and now U.S. Patent No. 3,420,792 issued January 7, 1969, it is disclosed that the addition of a small amount of a hexaalkylphosphoric triamide is a very effective stabilizer for the polyphenylene ethers when added in an amount ranging between 0.01 and about 10% by weight, calculated on the polymer. The hexaalkylphosphoric triamides may be represented by the following general formula:

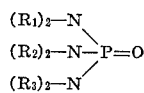

wherein $R_1$, $R_2$ and $R_3$ represent alkyl groups having from 1 to 6 carbon atoms.

It has now been found that a stabilizing combination of a hexaalkylphosphoric triamide, a boron compound and a phosphorus compound added to a polyphenylene ether results in a polymer having a much greater stability to heat and light as exemplified by a time to embrittlement increase of at least 150% as compared to a polyphenylene ether composition containing only a hexaalkylphosphoric triamide.

The boron component in the stabilizer composition is preferably selected from the group consisting of:

(a) boron oxide ($B_2O_3$), and
(b) boron acids of the formula:

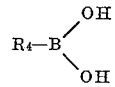

wherein $R_4$ is a member selected from the group consisting of hydroxyl, alkyl having from 1 to 15 carbon atoms and monocyclic aryl.

Typical boron acids falling within the above general formula are, for example, boric acid, methylboric acid, ethylboric acid, butylboric acid, hexylboric acid, phenylboric acid, methylphenylboric acid, xylylboric acid, 2,2'-dimethylheptylboric acid, 2-methyl-3-ethyloctylboric acid, etc.

The acid phosphorus component used in the stabilizing combination of this invention is a member selected from the group consisting of:

(a) phosphorus pentoxide
(b) phosphorus acid ($H_3PO_3$), and
(c) an organic derivative of a hypophosphorus acid and its salts, said derivative having the formula:

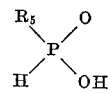

wherein $R_5$ is a member selected from the group consisting of hydrogen, monocyclic aryl and alkyl having from 1 to 8 carbon atoms.

Typical examples of the organic derivatives of the hypophosphorus acid corresponding to the general formula in sub-paragraph (c) above are, for example, hypophosphorus acid, methylphosphinic acid, ethylphosphinic acid, propylphosphinic acid, pentylphosphinic acid, hexylphosphinic acid, phenylphosphinic acid, xylylphosphinic acid, etc.

The quantity of stabilizer added to the polymer composition depends upon the activity of the stabilizer, the quality of the polymer to be stabilized and the conditions to which the polymer is to be exposed. The stabilizer may be added in an amount of between about 0.1 and about 10% by weight calculated on the polymer and preferably an amount of between 1.0 and 6.0% by weight, calculated on the polymer. The hexaalkylphosphoric triamide should be used in an amount at least equal to the amount of boron compound and acidic phosphorus compound and preferably, should be used in an amount equal to at least twice the amount of the remaining components of the stabilizer combination. In a preferred embodiment of this invention, the stabilizer composition consists of from 2.0 to 4.0% hexaalkylphosphoric triamide, from 1.0 to 2.0% boron compound and from 0.1 to 1.0% of the acidic phosphorus compound, all by weight calculated on the polymer.

The manner of adding the stabilizer to the polyphenylene ether is not critical to this invention. Hence, any convenient method can be employed. For example, the stabilizer can be blended with the resin powder in a blender such as a Waring blender. Alternatively, the resin can be dissolved in a suitable solvent and the stabilizer added to the solution. The stabilized polymer may then be recovered from solution.

The stabilized compositions of this invention are useful for all purposes for which the polyphenylene ethers have hitherto been used, for example, for conversion to films, fabrics, molded articles and the like by conventional methods.

The following examples serve to illustrate the invention but they are not intended to limit it thereto, the parts being by weight unless otherwise stated.

Example 1

This example illustrates a process for the formation of typical samples of a poly(2,6 - dimethyl - 1,4 - phenylene) ether containing various stabilizers as well as a method for evaluation of the stabilized samples. Resin, in powder form, and an appropriate stabilizer are blended together in a Waring blender for 1 to 3 minutes. The mixture is then fed to an extruder and extruded at a temperature of 500–600° F. The extruded strands are chopped into pellets. Two-gram samples of the extruded pellets are molded into films by preheating the samples for 1 minute at 550° F. and thereafter molding at a pressure of 20,000 p.s.i. at a temperature of 550° F. for 1 minute. The film samples so prepared have a thickness of 10 mils. They are cut into strips measuring 4 by 0.5 inches and placed in an air circulating oven maintained at 175° C. Time to embrittle is measured for each of the film samples by folding the samples at various times during the heat aging process until a film strip embrittles to a point where it snaps when partially folded. The time is measured as the time to embrittlement.

Examples 2–10

Table I represents stabilizer compositions and time to embrittle for samples prepared in accordance with the procedures set forth in Example 1.

TABLE I

| Example No. | Stabilizer composition | Time to embrittle (hrs.) |
|---|---|---|
| 2 | Control (no additive) | 30 |
| 3 | 2.0% hexamethylphosphoric triamide | 90 |
| 4 | 2.0% hexamethylphosphoric triamide, 1.0% $B_2O_3$, 1.0% phenylphosphinic acid. | 250 |
| 5 | 2.0% hexamethylphosphoric triamide, 1.0% $B_2O_3$, 1.0% sodium salt of phenylphosphinic acid. | 250 |
| 6 | 2.0% hexamethylphosphinic acid, 1.0% $B_2O_3$, 0.1% phosphorous acid. | 310 |
| 7 | 2.0% hexamethylphosphoric triamide, 1.0% $H_3BO_3$, 1.0% phenylphosphinic acid. | 260 |
| 8 | 2.0% hexamethylphosphoric triamide, 1.0% $B_2O_3$, 0.1% $P_2O_5$. | 290 |
| 9 | 2.0% hexamethylphosphoric triamide, 1.0% boric acid, 0.1% $P_2O_5$. | 275 |
| 10 | 2.0% hexamethylphosphoric triamide, 1.0% phenylboric acid, 0.2% $P_2O_5$. | 250 |

Examples 11–15

Table II represents the effect of stabilizer combinations within this invention on blends of 75% by weight of a poly - (2,6 - dimethyl - 1,4 - phenylene) ether and 25% by weight of a polystyrene.

TABLE II

| Example No. | Stabilizer composition | Time to embrittle (hrs.) |
|---|---|---|
| 11 | Control (no additive) | 45 |
| 12 | 2.0% hexamethylphosphoric triamide | 100 |
| 13 | 2.0% hexamethylphosphoric triamide, 1.0% $B_2O_3$, 0.1% $P_2O_5$. | 320 |
| 14 | 2.0% hexamethylphosphoric triamide, 1.0% boric acid, 0.1% $P_2O_5$. | 310 |
| 15 | 2.0% hexamethylphosphoric triamide, 1.0% phenylboric acid, 0.1– $P_2O_5$. | 275 |

Other compositions of this invention which would be expected to give results comparable to those obtained in Examples 4 through 7, Table I enclude:

(16) Polyphenylene ether plus 4.0% hexaethylphosphoric triamide plus 1.0% methylboric acid plus 1.0% methylphosphinic acid.

(17) Polyphenylene ether plus 3.0% hexapropylphosphoric triamide plus 1.0% butylboric acid plus 1.0% butylphosphinic acid.

(18) Polyphenylene ether plus 2.0% hexamethylphosphoric triamide plus 1.0% $B_2O_3$ plus 1.0% phenylphosphinic acid.

(19) Blend of a polyphenylene ether and a polystyrene with any of the stabilizer combinations noted above.

It should be obvious that the invention is susceptible to further modification within the scope of the appended claims.

What I claim as new and desire to secure by Letters Patent of the United States is:

1. A stabilized polyphenylene ether composition consisting of a major portion of a polyphenylene ether and a stabilizing quantity of a stabilizer consisting essentially of:

(1) a hexaalkylphosphoric triamide of the formula:

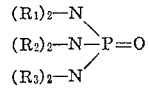

wherein $R_1$, $R_2$ and $R_3$ are alkyl groups having from 1 to 6 carbon atoms;

(2) a boron compound selected from the group consisting of
   (a) $B_2O_3$ and
   (b) a boron acid of the formula

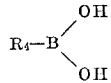

wherein $R_4$ is a member selected from the group consisting of hydroxyl, alkyl having from 1 to 15 carbon atoms and monocyclic aryl and (3) a member selected from the group consisting of
   (a) phosphorus acid,
   (b) an organic derivative of hypophosphorus acid and its salts

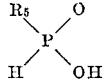

wherein $R_5$ is a member selected from the group consisting of hydrogen, alkyl having 1 to 8 carbon atoms and monocyclic aryl, and
   (c) phosphorus pentoxide.

2. The stabilized polyphenylene ether composition of claim 1 wherein the polyphenylene ether is a poly(2,6-dimethyl-1,4-phenylene) ether.

3. The stabilized polyphenylene ether of claim 1 wherein the stabilizer constitutes from 1.0 to 10% by weight of the composition, calculated on the polymer.

4. The stabilized polyphenylene ether composition of claim 1 wherein the stabilizer constitutes of from 1.0 to 6.0% by weight of the composition calculated on the polymer.

5. The stabilized polyphenylene ether composition of claim 1 wherein the hexaalkylphosphoric triamide is a hexamethylphosphoric triamide present in an amount ranging between 2.0 to 4.0% by weight calculated on the polymer, the boron compound is $B_2O_3$ present in an amount ranging between 1.0 to 2.0% by weight, calculated on the polymer and the acidic phosphorus compound is phenylphosphinic acid present in an amount ranging between 0.1 to 1.0% by weight, calculated on the polymer.

6. A stabilizer composition consisting essentially of:
(1) a hexaalkylphosphoric triamide of the formula:

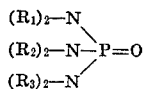

wherein $R_1$, $R_2$ and $R_3$ are alkyl groups having from 1 to 6 carbon atoms;
(2) a boron compound selected from the group consisting of
   (a) $B_2O_3$ and
   (b) a boron acid of the formula

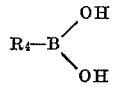

wherein $R_4$ is a member selected from the group consisting of hydroxyl, alkyl having from 1 to 15 carbon atoms and monocyclic aryl and
(3) a member selected from the group consisting of
   (a) phosphorus acid,
   (b) an organic derivative of hypophosphorus acid and its salts

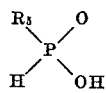

wherein $R_5$ is a member selected from the group consisting of hydrogen, alkyl having 1 to 8 carbon atoms and monocyclic aryl, and
(c) phosphorus pentoxide.

References Cited
UNITED STATES PATENTS

| | | | |
|---|---|---|---|
| 3,100,197 | 8/1963 | Heuck et al. | 260—45.9 |
| 3,131,164 | 4/1964 | Doyle et al. | 260—45.8 |
| 3,134,753 | 5/1964 | Kwiatek | 260—47 |
| 3,193,521 | 7/1965 | Jasching | 260—45.8 |
| 3,257,357 | 6/1966 | Stamatoff | 260—47 |
| 3,306,874 | 2/1967 | Hay | 260—47 |
| 3,374,288 | 3/1968 | Lange | 260—45.7 |

DONALD E. CZAJA, *Primary Examiner.*

H. E. TAYLOR, *Assistant Examiner.*

U.S. Cl. X.R.

252—397, 401; 260—45.7, 47, 876, 959